Patented July 14, 1936

2,047,614

UNITED STATES PATENT OFFICE 2,047,614

PRODUCTION OF ALKALI METAL SILICATES

Candido Cavezzale and Giuseppe Curreli, Messina, Italy

No Drawing. Application June 14, 1933, Serial No. 675,824. In Italy July 9, 1932

2 Claims. (Cl. 23—110)

The present invention relates to the production of sodium silicate and has particular reference to an improved process in which sodium silicate may be produced in an economical and satisfactory manner and in a form particularly advantageous.

It is customary to manufacture sodium silicate by two methods, namely, the wet method and the dry method. In producing sodium silicate by the dry method, a mixture of silica or silica-bearing sand is mixed in proper proportions with sodium carbonate and the mixture is fused, carbon dioxide being evolved. The wet method of producing sodium silicate consists generally in the dissolving of some silica-bearing material, such as quartz, sand, flint or the like, in a sodium hydroxide solution, the reaction possibly being as follows:

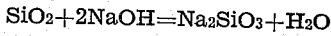
$$SiO_2 + 2NaOH = Na_2SiO_3 + H_2O$$

In the above equation, which shows the production of metal silicate, the reaction is taken as occurring directly between $SiO_2$ and sodium hydroxide. However, many natural compounds containing silica are used in the production of sodium silicate. It is to the so-called "wet" process of producing sodium silicate that the present invention refers.

A principal object of our invention is the provision of an economical and highly satisfactory process for producing sodium silicate in a particularly desirable form.

This and other objects will be apparent from the following illustrative and explanative description of our invention.

The natural silica-containing materials vary quite widely in chemical composition. For instance, examples of silica-containing materials are feldspar, garnet, mica, beryl and asbestos. Although each of the materials specified contains silica, it is generally conceded that the silica is in a complex combined compound, the exact nature of which is not entirely understood. When treated with a caustic soda solution, however, these compounds break up with the formation of sodium silicate.

In accordance with our invention, a silica-bearing material having certain peculiar physical characteristics is employed for the production of sodium silicate by the wet method, this silica-bearing material being pumice.

Pumice differs widely from the other silica-containing compounds mentioned hereinbefore in that it is of a colloidal nature. It is possible that the colloidal character of pumice is dependent upon the natural conditions under which the material is formed, as well as its chemical composition. More particularly, pumice consists of a colloidal mixture of gases dispersed in solids. For some reason, which we do not completely understand, it has been our discovery that the physical and chemical characteristics of pumice are such as to make the production of sodium silicate from this particular material as distinguished from other silica-bearing minerals highly advantageous, both from the standpoint of the process of producing sodium silicate and from the standpoint of the product obtained.

In accordance with our process, pumice stone is subjected to attack by caustic soda under heat and in the presence of steam pressure. Any desirable type of apparatus may be employed in which to carry out the process. For instance, a rotary pressure boiler may be used. An appropriate amount of pumice stone may be added to such a boiler and treated with a solution of caustic soda of a density which may be of the order of 12 to 14° Bé. When the pumice stone and caustic soda solution are mixed, a steam pressure of about four atmospheres may be maintained in the chamber or compartment in which the process is carried out, it being desirable to rotate the compartment or boiler at a rate which ordinarily will not be in excess of 4 to 6 R. P. M.

The quantity of caustic soda which is employed is calculated in accordance with the quantity of pumice stone to be broken down, the commercial quality of the silicate of soda which it is desired to obtain also being a factor in this regard. Ordinarily the constituents of the reaction mixture are so controlled that the solution obtained from the pressure boiler will be not more than substantially 25 to 26° Bé. in density. We have found that a density in excess of 26° Bé. is apt to result in the formation of soluble alkaline aluminum compounds which enter into the solution with the sodium silicate.

After the reaction between the sodium hydroxide solution and the pumice stone is complete, the reaction mixture is filtered through a suitable pressure filter or otherwise treated to remove the insoluble constituents of the mixture, which constituents include the hydrate of aluminum which remains in the reaction mixture in an insoluble condition, and small amounts of impurities such as calcium, iron and magnesium which are contained in pumice stone.

After filtration the silicate of soda solution is concentrated to the desired density, which may be of the order of 38 to 40° Bé.

We have also found that potassium silicate may be produced in the manner described by the substitution of potassium hydroxide for the sodium hydroxide described herein.

The process described is found in practice to be carried out with little difficulty, and the sodium silicate produced is of a high grade. In particular the process is advantageous from the standpoints of rapidity and completeness of the reaction. Also, we have found the separation of the sodium silicate solution from the insoluble constituents of the reaction mixture may be easily and effectively controlled. It is possible that the advantages obtained by our process are due to the peculiar physical construction of pumice as distinguished from other natural silica-bearing materials which do not have the colloidal nature characteristic of pumice. However, regardless of theory, we have found the process to be highly advantageous.

It will be found that the process as specifically described herein may be altered in detail without departing from the spirit of our invention, and all such alterations and modifications are intended to be included in the appended claims.

We claim:

1. The process of producing an alkali metal silicate, which comprises reacting pumice with a solution of an alkali metal hydroxide, the constituents of said reaction mixture being regulated so as to produce when the reaction is complete a solution of not more than substantially 26° Bé. density, filtering the reaction mixture when the reaction between the alkali metal hydroxide and the pumice is substantially complete, and concentrating the filtrate so obtained.

2. The process of producing an alkali metal silicate, which comprises reacting pumice with a solution of an alkali metal hydroxide under heat and in the presence of steam pressure, agitating the reaction mixture during the reaction between the alkali metal hydroxide and the pumice, regulating the constituents of the reaction mixture so as to produce when the reaction is complete a solution of substantially not more than 26° Bé. density, filtering the reaction mixture when the reaction between the alkali metal hydroxide and the pumice is substantially complete, and concentrating the filtrate so obtained to a density of at least 38° Bé.

CANDIDO CAVEZZALE.
GIUSEPPE CURRELI.